US012699021B2

(12) United States Patent
Nielsen et al.

(10) Patent No.: US 12,699,021 B2
(45) Date of Patent: Aug. 4, 2026

(54) LEAK TESTING APPARATUS

(71) Applicant: VESTAS AIRCOIL A/S, Lem St. (DK)

(72) Inventors: Frank Nielsen, Engesvang (DK); Claus Hessler Ibsen, Skjern (DK)

(73) Assignee: VESTAS AIRCOIL A/S, Lem St. (DK)

( * ) Notice: Subject to any disclaimer, the term of this patent is extended or adjusted under 35 U.S.C. 154(b) by 247 days.

(21) Appl. No.: 18/288,257

(22) PCT Filed: Apr. 21, 2022

(86) PCT No.: PCT/DK2022/050081
§ 371 (c)(1),
(2) Date: Oct. 25, 2023

(87) PCT Pub. No.: WO2022/228627
PCT Pub. Date: Nov. 3, 2022

(65) Prior Publication Data
US 2024/0210269 A1     Jun. 27, 2024

(30) Foreign Application Priority Data
Apr. 26, 2021     (DK) ............................ PA 2021 70187

(51) Int. Cl.
*G01M 3/28*          (2006.01)
*B25J 19/02*         (2006.01)
(52) U.S. Cl.
CPC ........... *G01M 3/2869* (2013.01); *B25J 19/02* (2013.01)
(58) Field of Classification Search
CPC ... G01M 3/022; G01M 3/2853; G01M 3/2869
See application file for complete search history.

(56) References Cited

U.S. PATENT DOCUMENTS

| | | | |
|---|---|---|---|
| 2,507,124 | A | 5/1950 | Stillinger |
| 3,029,630 | A | 4/1962 | Cummins |

(Continued)

FOREIGN PATENT DOCUMENTS

| | | |
|---|---|---|
| CN | 201166599 Y | 12/2008 |
| CN | 201289425 Y | 8/2009 |

(Continued)

OTHER PUBLICATIONS

International Search Report for PCT/DK2022/050081 mailed Aug. 3, 2022.

(Continued)

*Primary Examiner* — Erika J. Villaluna
(74) *Attorney, Agent, or Firm* — Schmeiser Olsen PLLC

(57) ABSTRACT

A leak testing apparatus is provided, for testing connections between tubes penetrating a plate material. A housing is disclosed having a central cylindrical longitudinal hollow. A piston arranged inside housing, where a distal end of the piston in use is inserted into the tube. A seal arranged circumferentially on the piston, such that in use the second seal may be brought into sealing engagement with the tube. A second end of the housing is closed by an endcap where at least one channel is provided longitudinally in the piston and a connection to the channel allowing connection to a source of pressurized medium is provided, connecting the pressurized medium to a space, in use limited by the first seal, the plate material, the tube and the second seal, and optionally part of the piston and part of the housing.

12 Claims, 5 Drawing Sheets

(56)                    References Cited

U.S. PATENT DOCUMENTS

| | | | | | |
|---|---|---|---|---|---|
| 3,882,715 | A | | 5/1975 | Slinger | |
| 3,950,983 | A | | 4/1976 | Slinger | |
| 4,602,500 | A | | 7/1986 | Kelly | |
| 4,753,108 | A | * | 6/1988 | Jansch | G01M 3/022 |
| | | | | | 138/90 |
| 6,282,461 | B1 | * | 8/2001 | Gan | G06T 7/74 |
| | | | | | 700/258 |

FOREIGN PATENT DOCUMENTS

| | | | |
|---|---|---|---|
| CN | 202974593 | U | 6/2013 |
| CN | 110940471 | A | 3/2020 |
| CN | 211317647 | U | 8/2020 |

OTHER PUBLICATIONS

Danish Search Report for PA 2021 70187 completed Nov. 2, 2021.
Written Opinion for PCT/DK2022/050081 mailed Aug. 3, 2022.

* cited by examiner

1

LEAK TESTING APPARATUS

CROSS-REFERENCE TO RELATED APPLICATIONS

This application claims priority to PCT Application No. PCT/DK2022/050081, having a filing date of Apr. 21, 2022, which is based on DK Application No. PA 2021 70187, having a filing date of Apr. 26, 2021, the entire contents both of which are hereby incorporated by reference.

FIELD OF TECHNOLOGY

The following is directed to an apparatus for leak testing of joints between tubes and tube sheets. The following also discloses a method for carrying out a testing procedure using such an apparatus.

BACKGROUND

In the conventional art, there is a number of situations where it is necessary to test the tightness between a pipe penetrating a plate, particularly in applications where it is desirable to have for example a liquid on one side of the plate and air or other liquid/media on the other side of the plate. Leaking in the connection between the pipe and the plate is undesirable. Naturally, it will be possible to introduce a liquid on one side of the plate and then optically detect whether or not there is a leak, after which the leak may be repaired. However, for industrial purposes, this is a very cumbersome and impractical manner of testing such connections. Further, a problem arises when there is a large number of pipes penetrating a plate member in a very small area, such that the distance between adjacent pipes is very limited. In such situations it may be very difficult to detect which pipe is leaking, and furthermore the repair may also be rather cumbersome.

U.S. Pat. No. 4,602,500A discloses one solution for a leak testing apparatus, for testing connections between tubes penetrating a plate material.

SUMMARY

An aspect relates to a leak testing apparatus which is easy to use, easy to apply, and may be applied in a very quick and safe manner in order to reliably detect potential leaks for pipes penetrating plates.

Embodiments of the invention address this by providing a leak testing apparatus, for testing connections between tubes penetrating a plate material, wherein the apparatus comprises:

a housing having a central cylindrical longitudinal hollow, the housing having a first end, in use adapted to engage the plate material surrounding the tube, and a second end opposite the first end, where a first seal is arranged projecting from the first end;

a piston arranged inside the housing, the piston having a longitudinal axis parallel to the longitudinal extent of the hollow, where a distal end of the piston in use is inserted into the tube;

a second seal arranged circumferentially on the piston, such that in use the second seal may be brought into sealing engagement with the tube;

where the second end of the housing is closed by an endcap where at least one channel is provided longitudinally in the piston and a connection to the channel allowing connection to a source of pressurized medium is provided, connecting the pressurized medium to a space, in use limited by the first seal, the plate material, the tube and the second seal, and optionally part of the piston and part of the housing.

In an embodiment, when manufacturing and quality-testing heat exchangers or large cooling installations, a number of pipe penetrations through plates is necessary in order to provide sufficient heat exchange area in a heat exchanger. In these constructions, the pipes will typically be very close to each other and as such, there is not much space to operate on. With embodiments of the present invention, all the extra space required adjacent to a pipe penetration is sufficient space in order for the first seal to come into sealing engagement with the surrounding plate. As the piston operates inside the pipe's diameter, accommodation of the first seal is all the space needed adjacent the pipe. Once this connection is established, the piston, together with the housing, will create a very small but efficient pressure chamber surrounding the interface between the tube and the plate. When applying an air pressure or a liquid pressure to this confined pressure chamber, it is relatively easy to register whether there is a drop in pressure due to a leak or that the pressure is maintained. At the same time, the entire testing only involves the area immediately surrounding the interface between the plate and the pipe, and as such, the involvement of the remaining part of the structure, for example a heat exchanger, is very, very limited.

Furthermore, due to the very limited space required by the first seal surrounding the pipe, it is possible to apply a plurality of leak testing apparatuses close to each other, for example on every second or every third pipe, and in this manner carry out the testing in an expedient and rational manner. If the pressurised medium for example is air, there is furthermore no "pollution" connected with the test, whereas if water or oil is used, it will be necessary to clean the plate after the testing procedure. Also, if the air molecules are too large, it may be possible to test with for example a gas having smaller molecules, in order to be able to detect even minute leaks.

In a further embodiment of the invention, the housing has an outer surface, where on the outer surface engagement means are provided, the engagement means adapted to connect the leak testing apparatus to a robot, which robot is programmable to execute a leak testing routine. As for example a heat exchanging unit has a large number of tubes penetrating a plate where the pipes/tubes are arranged in a well-defined geometrical relationship, it is desirable to carry out the testing in an automated manner, for example by applying a robot to handle the leak testing apparatus, the testing may be carried out very efficiently. The robot will either, based on pre-programmed coordinates, be able to insert the leak testing apparatus in the pipes correctly or, by for example a vision system, recognise where the leak testing apparatus shall be applied. At the same time, it is relatively easy to program the robot to identify the exact pipe which is being tested and at the same time to store the test results.

In a further embodiment of the invention, means are provided inside the housing for urging the piston away from the end cap, thereby bringing the second seal into sealing engagement with the tube.

Furthermore, in order to achieve this movement of the piston relative to the housing, the leak testing apparatus in a further embodiment provides that the means may be:

A helical spring arranged between the endcap and the end of the piston, or;

Pressurized gas introduced into the housing between the endcap and the end of the piston, or;

A threaded member arranged in the endcap, such that a thread is provided in the endcap into which the threaded member is screwed, where a distal end of the threaded member engages the end of the piston.

These means are all rather conventional, but they assure that a safe and tight connection may be achieved. In an embodiment, the use of the pressurised gas in instances where the actual leak testing is also carried out with a gas is very convenient, however it requires that the gas conduits inside the housing are split into two, such that the gas supplied to the testing chamber is completely separated from the gas urging the piston and thereby the second seal against the end of the tube.

In a further embodiment, the second seal is rotationally symmetric around the pistons' longitudinal axis and has a conical shape, such that the narrower part of the conical shape is arranged towards the end of the piston which in use is inserted into the tube. Due to the conical shape, it is assured that the piston will fit to the pipe diameter. Usually, the leak testing apparatus is elected for a standard type of pipe diameter, such that various leak testing apparatuses are necessary in order to be able to test various pipes/tubes (with different diameters). However, the pipes even having the same nominal diameter will have variations in the diameter after they have been deformed in order to press-fit against the plate during the manufacturing process. Therefore, there will be (slight) variations in the diameter of the pipes/tubes which the conical-shaped second seal will compensate for, and in this manner create a tight seal sufficient for carrying out the pressure test of the connection.

In an alternative embodiment, a further aspect of the invention discloses that the piston comprises two elements: a first element being an outer piston cylinder, where a part of the outer piston cylinder in use is inserted into the tube, where concentrically inside the outer piston cylinder is arranged a plunger, where the plunger extends outside a first end of the outer piston cylinder, and where the distal end of the part of the plunger extending outside the outer piston cylinder is provided with an enlargement, and where the second seal is arranged between the enlargement and the end of the outer piston cylinder, such that when the plunger is moved along the longitudinal axis, bringing the enlargement closer to the end of the outer piston cylinder, the second seal will expand radially outwards, in use against the inner wall of the tube. With this embodiment, the expansion of the second seal inside the tube will establish the seal and thereby establish the pressure chamber.

The embodiment discussed above is designed to create a seal by engaging the end rim of the pipe, whereas in this embodiment, the seal is carried out inside the tube.

In a further improvement of this embodiment, the surfaces of the enlargement and the outer piston cylinder, facing the seal will have oblique surfaces such that the distance between the enlargements surface and the outer piston surface is larger at the periphery than closer to the plunger, whereby in use as the plunger is moved closer to the end of the outer piston cylinder the oblique surfaces will urge the seal into sealing contact with the tubes inner wall.

With this configuration of the surfaces, the seal will be urged radially outwards as the two surfaces are brought closer to each other. Thereby, the forces needed to create the deformation of the seal, such that it creates a sealing engagement with the inner side of the tube, may be lessened and a better contact may be achieved.

One common technique of creating tight connections between a pipe penetrating a thin plate is by so-called tube expansion process, where the aperture in the plate is slightly larger than the tube, and once the tube has been installed/penetrated through the plate, a tool is arranged inside the tube in order to expand the outer diameter of the tube, such that it will come into mechanical engagement with the surrounding plate material. Embodiments of the present invention are specifically for use in connection with testing of this type of connections, but also other types, for example welded, soldered, adhesive or other types of connections may be tested using the apparatus described above.

Embodiments of the invention are also directed to a method of using, such a leak testing apparatus as described above, and obviously such a method will in an expedient manner obtain the advantages as already explained. Furthermore, by installing a robot adapted to arrange/insert the leak-testing apparatuses, the process of testing a large number of connections between tubes and plates may be carried out in a rational, expedient and cheap manner. This is all facilitated by the inventive apparatus and as such, the overall combination of the leak testing apparatus with an automatic means, such as for example a robot, brings great advantages to the quality control testing and overall performance of the device.

BRIEF DESCRIPTION

Some of the embodiments will be described in detail, with reference to the following figures, wherein like designations denote like members, wherein.

DETAILED DESCRIPTION

Figure 1:
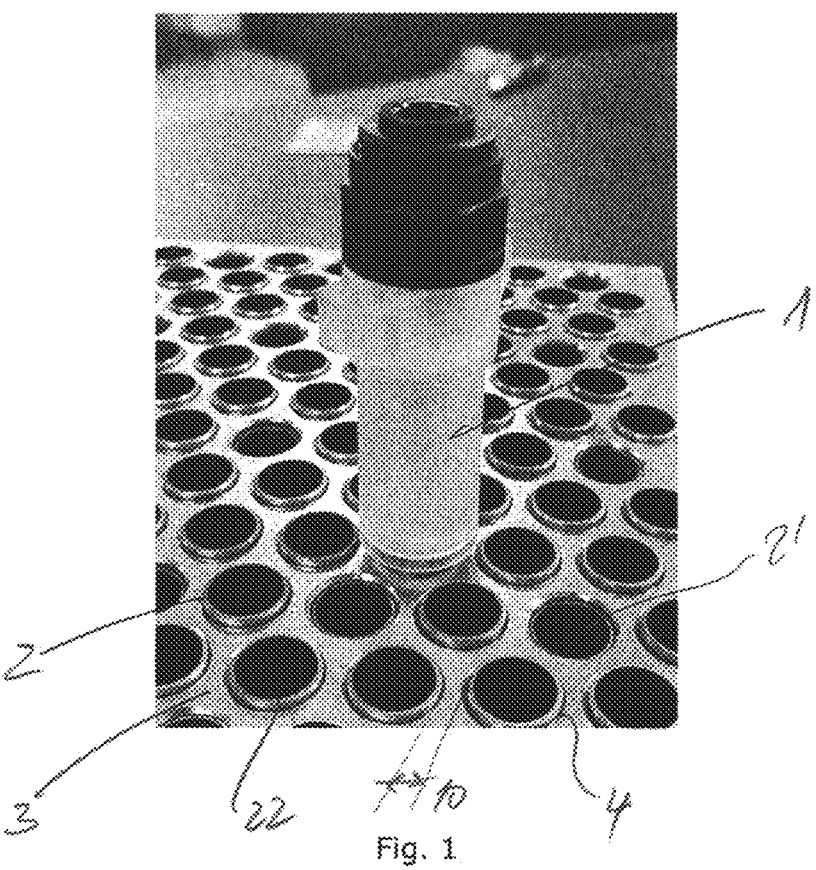
FIG. 1 illustrates a first embodiment of the invention where the leak-testing apparatus 1 has been inserted in a tube 2.

In FIG. 1 is illustrated a first embodiment of the invention, where the leak-testing apparatus 1 has been inserted in a tube 2. The tube has been installed in a plate material 3 in such a manner that a mechanical tightening has been established between a rim of an aperture 4, through which the tube is inserted, and the outside of the tube 2. The aspect of embodiments of the present invention is to test the tightness of the connection between the tube 2 and the rim 4 of the aperture in the plate material 3. The plate material may have many thicknesses, but typically, the material thickness in the actual direction indicated by the dashed line 100 (see FIG. 2) is often between 0.4 mm up to 50 mm when this apparatus is used for example with heat-exchangers for industrial applications the plate thickness is typically between 5 mm and 50 mm. Likewise, just for an example, the diameter of the tube may be 10 mm and the distance between adjacent tube openings 10 may for example be 1 to 50 mm.

As is evident from FIG. 1, the pipe ends 2 penetrating the plate 3 are arranged in very close proximity to each other and in a rational and determined manner (geometrical pattern) across the entire plate 3.

Figure 2:
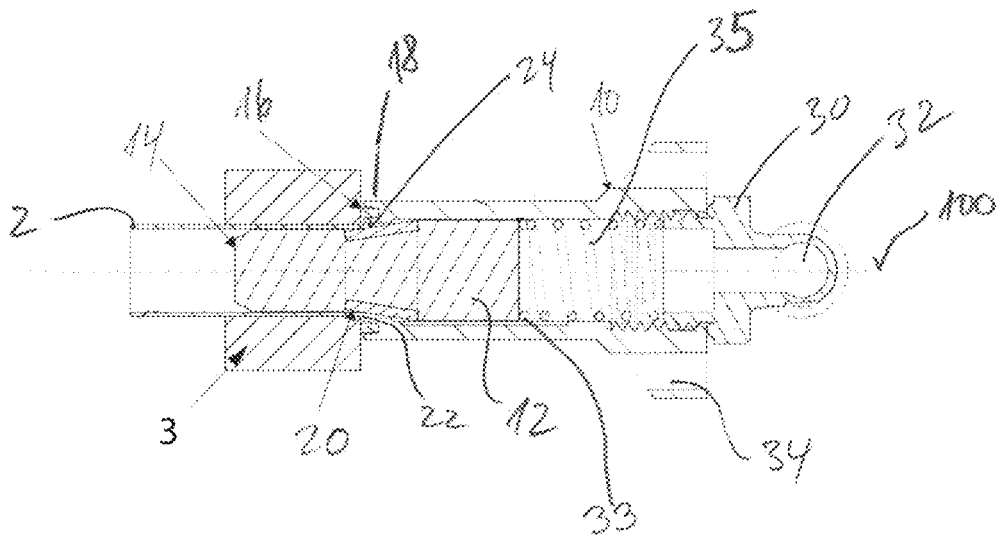
FIG. 2 illustrates a cross-section through an embodiment of the invention.

Turning to FIG. 2, a cross-section through an embodiment of the invention is illustrated, where the leak-testing apparatus 1 has been inserted in a tube 2. The tube 2 is arranged, as illustrated in FIG. 1, penetrating a plate 3.

In this embodiment, the apparatus 1 comprises a housing 10, inside which housing a piston 12 is arranged. A front part 14 of the piston 12 is inserted inside the tube 2. During the insertion of the piston 12 inside the tube 2, a first seal 16 is arranged projecting from a first end 18 of the housing 10. On the piston 12 is arranged a second seal 20 which, during the insertion of the piston 12 inside the tube 2, comes into contact with the rim 22 of the pipe 2. As illustrated in FIG. 1, the rim 22 of the pipe 2 may extend above the plate material 3 or be substantially flush or sunk relative to the plate material as illustrated with reference to the pipe endings 2'. In the embodiment illustrated in FIG. 2, the rim 22 of the pipe 2 extends slightly above the surface of the plate material 3. As the piston 12 is inserted into the pipe 2, the second seal 20 will engage the rim 22 of the pipe, and thereby establish a tight connection. At the same time, the first seal 16 has engaged a surface of the plate 4, also establishing a tight seal. Therefore, a small space 24 is created, where the space is limited by the housing 10, including the first seal 16, the plate material 4 and the second seal 20.

The housing 10 is furthermore provided with an end cap 30, where in this embodiment the end cap 30 is provided with a connection 32 to a source of pressurised gas. Inside the housing, in a longitudinal direction indicated by the dash line 100, an air channel 33 is provided on the inside wall of the housing 10, such that the pressurised gas provided through the connection 32 may pass the piston and enter the space 24, such that the space 24 may be pressurised in order to test the connection between the plate material 3 and the pipe 2.

In order to maintain the piston 12 in tight connection both with the housing and the inner diameter of the pipe 2, a helical spring 35 is arranged inside the housing in order to urge the piston 12 away from the end cap 30.

Figure 5:
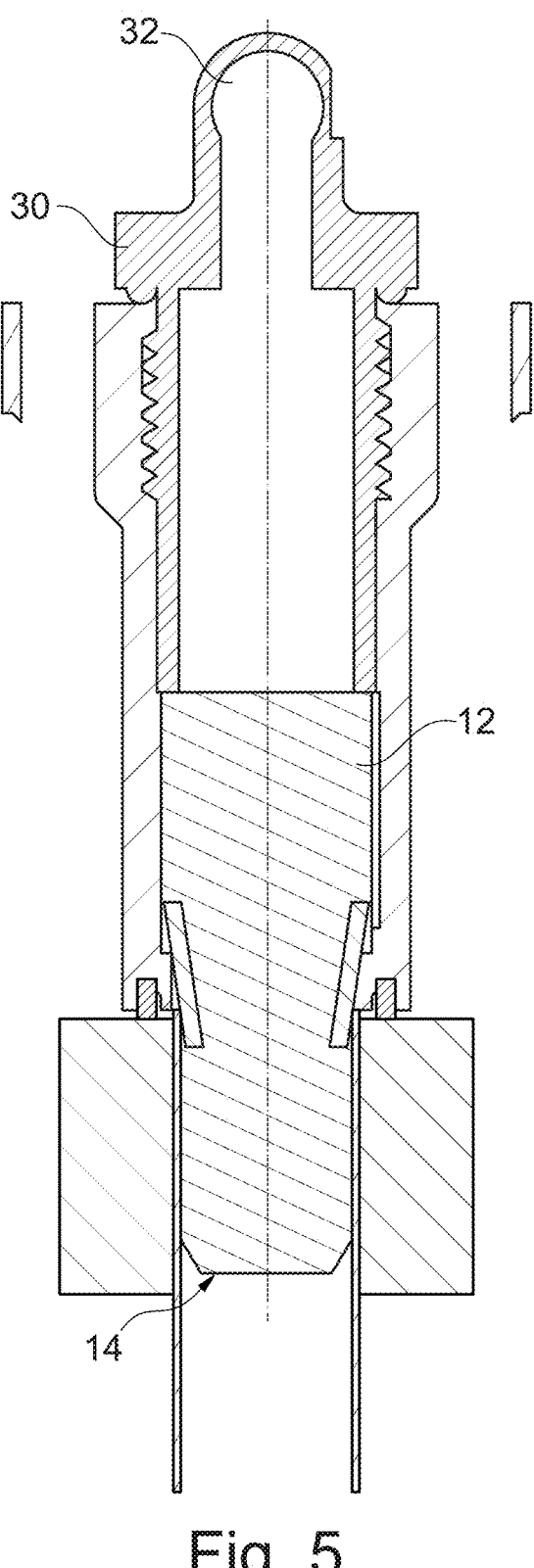
FIG. 5 illustrates another embodiment of the invention where the threaded member engages the end of the piston.

In an alternative embodiment, illustrated in FIG. 5 the threaded member 30 engages the end of the piston 12.

In other embodiments of the invention, the pressurised gas supplied through the end cap 30 may be used to urge the piston 12 and the second seal 20 against the inner side of the rim 22 of the pipe 2.

The housing 10 is furthermore provided with apertures 34 arranged circumferentially on the outside of the housing 10, such that engagement means, for example from a robot, may be inserted in the apertures in order to guide the leak-testing apparatus 1 to desired test positions.

Figure 3:
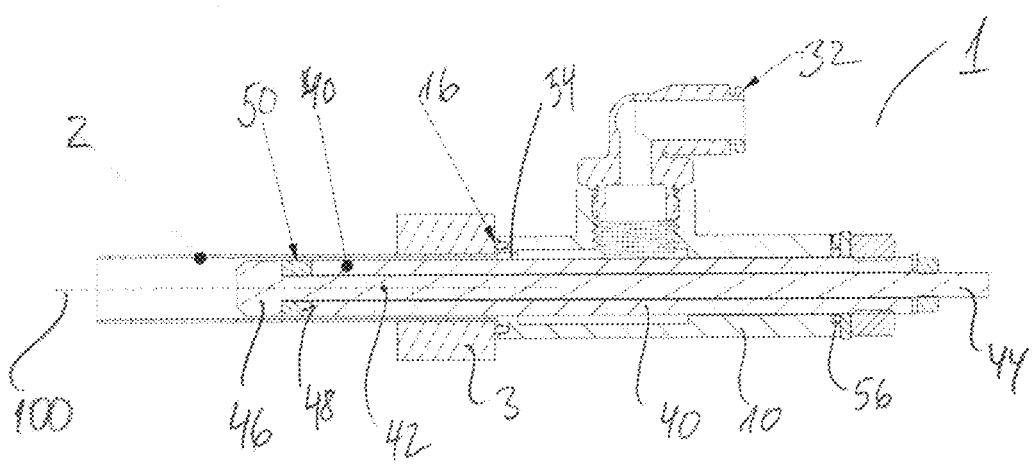
FIG. 3 illustrates another embodiment of the invention, where the leak-testing apparatus 1 is inserted into a pipe 2.

In FIG. 3 is illustrated another embodiment of the invention, where the leak-testing apparatus 1 is inserted into a pipe 2. The pipe penetrates a plate 3, where it is desirable to test the tightness of the connection between the plate 3 and the pipe 2.

The leak-testing apparatus comprises a housing 10. Inside the housing is provided an arrangement comprising an outer piston cylinder 40, and inside the outer piston cylinder 40 is arranged a plunger 42 concentrically with the outer piston cylinder 40. The plunger 42 is movable relative to the outer piston cylinder and may be manipulated from the outside due to the fact that and end 44 of the plunger extends outside the housing 10 of the leak-testing apparatus 1.

Figure 4:
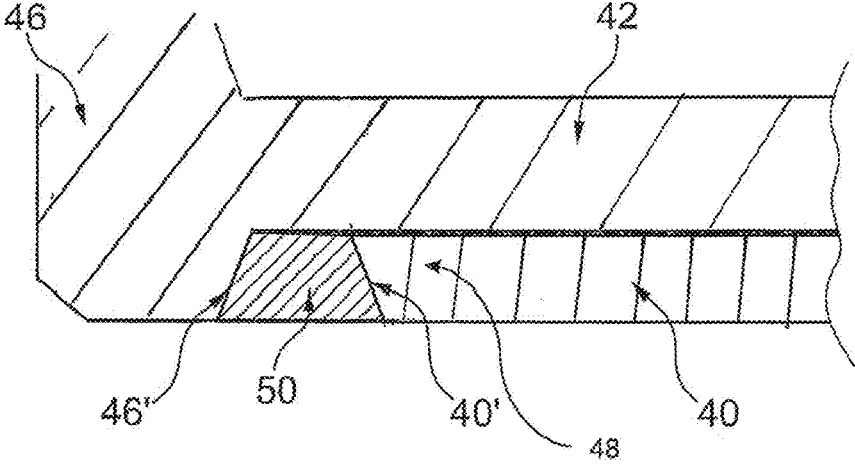
FIG. 4 illustrates a detail of another embodiment of the invention where oblique surfaces are arranged on either side of the seal.

The plunger is furthermore provided with an enlargement 46 in a distal end which in use will be inserted into the tube 2. Between the enlargement 46 and the free end 48 of the outer piston cylinder 40 is arranged a second seal 50, see FIG. 4. By moving the plunger relative to the outer piston cylinder 40, thereby reducing the distance between the enlargement 46 and the free end 48 of the outer piston cylinder 40, the second seal 50 will be compressed and deformed and thereby create a tight seal between the inner wall of the tube 2 and the housing 10. In the embodiment illustrated in FIG. 4, the surface 46' of the enlargement 46 and the surface 40' of the outer piston cylinder 40 facing each other have oblique surfaces 40',46'. The housing 10 is, as it was the case with the embodiment of the invention discussed above with reference to FIG. 2, provided with a first seal 16 such that a space 54 is created. The space 54 is limited by the housing 10, the first seal 16, the outer piston cylinder 40, the second seal 50 and an end seal 56 arranged between the housing 10 and the outer piston cylinder 40.

Furthermore, the leak-testing apparatus 1 is provided with a connection for a pressurised medium, such as for example air, where the connection 32 is connected to the space 54 as described above. In this manner, by applying a pressurised gas such as for example air to the space, testing of the tightness of the connection between the plate 3 and the tube 2 may be carried out. Once the test has been completed, the plunger 42 is moved relative to the outer piston cylinder 40 such that the second seal 50 will move back to its original shape (be released), whereby the leak-testing apparatus 1 may be removed from the tube 2.

Figure 6:
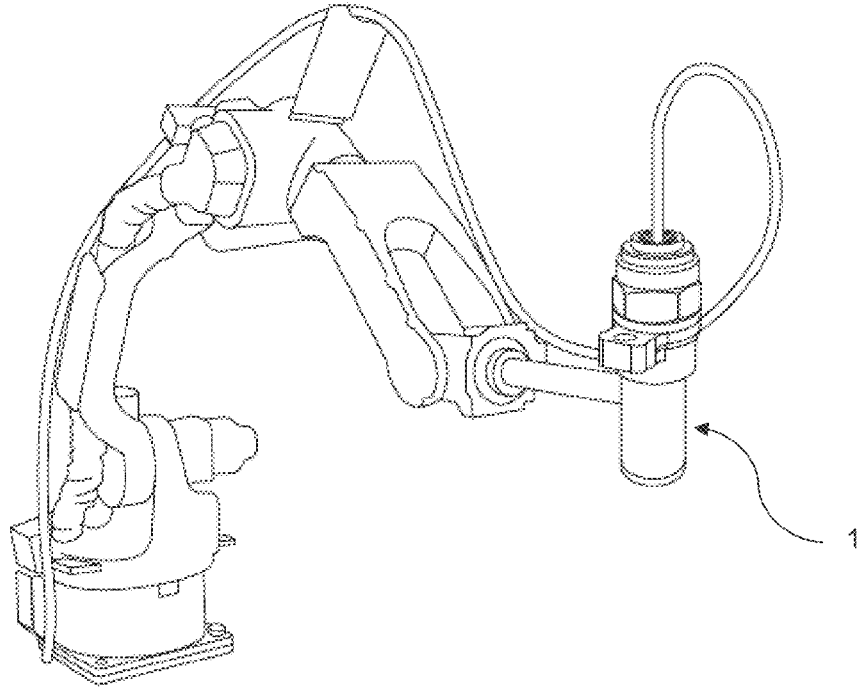
FIG. 6 illustrates an embodiment where a robot is provided with a leak testing apparatus according to the invention.

In operation, as illustrated in FIG. 6 the leak-testing apparatus according to the invention is provided with one or more fixtures 34, such that a robot may manipulate the leak-testing apparatus position.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A leak testing apparatus, for testing connections between a tube penetrating a plate material and the plate material, wherein the apparatus comprises:

a housing having a central cylindrical longitudinal hollow, the housing having a first end, in use configured to engage the plate material surrounding the tube by abutting the plate material without longitudinally overlapping the plate material, and a second end opposite the first end, where a first seal is arranged projecting from the first end and where the second end of the housing is closed by an end cap;

a piston arranged inside the housing, the piston having a longitudinal axis parallel to the longitudinal extent of the hollow, where a distal end of the piston in use is inserted into the tube;

a second seal arranged circumferentially on the piston, such that in use the second seal may be brought into sealing engagement with the tube;

wherein at least one channel is provided longitudinally in the piston and a connection to the channel allowing connection to a source of pressurized medium is provided, connecting the pressurized medium to a space, in use limited by the first seal, the plate material, the tube and the second seal, and optionally part of the piston and part of the housing; and wherein means are provided inside the housing for urging the piston away from the end cap, thereby bringing the second seal into sealing engagement with the tube.

2. The leak testing apparatus according to claim 1, wherein the housing has an outer surface, where on the outer surface engagement means are provided, the engagement means configured to connect the leak testing apparatus to a robot, which robot is programmable to execute a leak testing routine.

3. The leak testing apparatus according to claim 1, wherein the means may be:

a helical spring arranged between the end cap and the end of the piston, or;

pressurized gas introduced into the housing between the end cap and the end of the piston, or; and a threaded member arranged in the end cap, such that a thread is provided in the end cap into which the threaded member is screwed, where a distal end of the threaded member engages the end of the piston.

4. The leak testing apparatus according to claim 1, wherein the second seal is rotationally symmetric around the piston's longitudinal axis and has a conical shape, such that the narrower part of the conical shape is arranged towards the end of the piston which in use is inserted into the tube.

5. The leak testing apparatus according to claim 1, wherein the piston comprises two elements: a first element being an outer piston cylinder, where a part of the outer piston cylinder in use is inserted into the tube, where concentrically inside the outer piston cylinder is arranged a plunger, where the plunger extends outside a first end of the outer piston cylinder, and where the distal end of the part of the plunger extending outside the outer piston cylinder is provided with an enlargement, and where the second seal is arranged between the enlargement and a free end of the outer piston cylinder, such that when the plunger is moved along the longitudinal axis, bringing the enlargement closer to the free end of the outer piston cylinder, the second seal will expand radially outwards, in use against the inner wall of the tube.

6. The leak testing apparatus according to claim 5, wherein a surface of the enlargement facing the second seal and a surface of the outer piston cylinder facing the second seal will have oblique surfaces such that the distance between the surface of the enlargement surface and the outer piston surface is larger at the periphery than closer to the plunger, whereby in use as the plunger is moved closer to the end of the outer piston cylinder the oblique surfaces will urge the seal into sealing contact with the tubes inner wall of the tube.

7. The leak testing apparatus according to claim 1, wherein the connection between the plate material and the tube is obtained by a tube expansion process.

8. A method of using a leak testing apparatus according to claim 1, in a process of testing the tightness of a connection between an outer perimeter of the tube penetrating the plate material:

a) positioning the housing to overlap the rim of the tube and abut the plate material, where the first seal projecting from the first end of the housing is arranged, such that the first seal is in sealing contact with the plate material such that the first seal circumscribes the connection between the outer perimeter of the tube penetrating the plate material and further;

b) inserting and activating the piston into the tube, whereby the second seal is brought into sealing contact with the tube; and c) applying and monitoring a gas pressure in the space limited by the first seal, the plate material, the tube and the second seal, and optionally part of the piston and part of the housing.

9. The method according to claim 8, wherein a robot is provided with one or more fixtures for holding a leak testing apparatus, and where the robot is pre-programmed to seek out open tube ends and insert the leak testing apparatus in the open tube ends in a consecutive manner, carrying out a test regime for a specified number of tube ends, where the test regime comprises steps a) through c).

10. The leak testing apparatus according to claim 1, wherein the tube extends from the plate material and the housing overlaps a rim of the tube while abutting the plate material.

11. The leak testing apparatus according to claim 1, wherein the tube is flush with the plate material.

12. The leak testing apparatus according to claim 1, wherein the tube is sunk relative to the plate material.

\* \* \* \* \*